United States Patent
Li et al.

(10) Patent No.: US 9,838,914 B2
(45) Date of Patent: Dec. 5, 2017

(54) METHOD FOR CONTROLLING TRANSMISSION, NETWORK DEVICE, AND TERMINAL

(71) Applicant: Huawei Technologies Co., Ltd., Shenzhen, Guangdong (CN)

(72) Inventors: Hantao Li, Beijing (CN); Min Huang, Shanghai (CN); Qin Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 332 days.

(21) Appl. No.: 14/562,515

(22) Filed: Dec. 5, 2014

(65) Prior Publication Data

US 2015/0092748 A1 Apr. 2, 2015

Related U.S. Application Data

(63) Continuation of application No. PCT/CN2012/076631, filed on Jun. 8, 2012.

(51) Int. Cl.
*H04W 36/00* (2009.01)
*H04W 36/30* (2009.01)
(Continued)

(52) U.S. Cl.
CPC ....... *H04W 36/0022* (2013.01); *H04W 36/14* (2013.01); *H04W 36/22* (2013.01);
(Continued)

(58) Field of Classification Search
CPC . H04W 88/06; H04W 36/0022; H04W 36/22; H04W 36/30; H04W 36/14
See application file for complete search history.

(56) References Cited

U.S. PATENT DOCUMENTS

2006/0291419 A1 12/2006 McConnell et al.
2008/0200195 A1 8/2008 Abe et al.
(Continued)

FOREIGN PATENT DOCUMENTS

| CN | 101006737 A | 7/2007 |
| CN | 101635916 A | 1/2010 |

(Continued)

*Primary Examiner* — Redentor Pasia (57) ABSTRACT

Embodiments of this application relate to a method for controlling transmission, a network device, and a terminal. The method includes: determining, by a first radio access network device according to a service transmission condition of a terminal in a first single-mode wireless communications system, that a multimode wireless communications system comprises at least two wireless communications systems transmits a service for the terminal; and sending, by the first radio access network device, first control information to the terminal, where the first control information includes link information of the at least two wireless communications systems, so that the terminal switches a service, which is transmitted in the first single-mode wireless communications system, to the multimode wireless communications system according to the link information of the at least two wireless communications systems. In this way, resource utilization of a wireless communications network is improved.

24 Claims, 6 Drawing Sheets

(51) Int. Cl.
H04W 36/28 (2009.01)
H04W 36/22 (2009.01)
H04W 88/06 (2009.01)
H04W 36/14 (2009.01)

(52) U.S. Cl.
CPC .......... H04W 36/28 (2013.01); H04W 36/30 (2013.01); H04W 88/06 (2013.01)

(56) References Cited

U.S. PATENT DOCUMENTS

| | | | | |
|---|---|---|---|---|
| 2009/0180440 | A1* | 7/2009 | Sengupta | H04W 36/14 370/331 |
| 2009/0280802 | A1* | 11/2009 | Chin | H04W 36/0088 455/426.1 |
| 2009/0285186 | A1* | 11/2009 | Chin | H04W 68/12 370/335 |
| 2010/0302958 | A1 | 12/2010 | Wietfeldt et al. | |
| 2011/0299429 | A1* | 12/2011 | Tiwari | H04W 36/0022 370/259 |
| 2012/0257549 | A1* | 10/2012 | Chin | H04W 36/14 370/280 |
| 2013/0244723 | A1* | 9/2013 | Yerrabommanahalli | H04W 48/16 455/552.1 |
| 2014/0064202 | A1* | 3/2014 | Nordstrom | H04W 76/045 370/329 |
| 2014/0221041 | A1* | 8/2014 | Yoon | H04B 1/0067 455/552.1 |
| 2014/0241252 | A1 | 8/2014 | Wang et al. | |
| 2014/0315597 | A1* | 10/2014 | Periyalwar | H04W 76/026 455/552.1 |

FOREIGN PATENT DOCUMENTS

| | | |
|---|---|---|
| CN | 102340843 A | 2/2012 |
| CN | 102340891 A | 2/2012 |
| CN | 102469529 A | 5/2012 |
| GB | 2 422 515 | 7/2006 |
| WO | WO 2011/017970 | 2/2011 |

* cited by examiner

METHOD FOR CONTROLLING
TRANSMISSION, NETWORK DEVICE, AND
TERMINAL

CROSS-REFERENCE TO RELATED APPLICATIONS

This application is a continuation of International Application No. PCT/CN2012/076631, filed on Jun. 8, 2012, which is hereby incorporated by reference in its entirety.

TECHNICAL FIELD

This application relates to the field of communications technologies, and in particular, to a method for controlling transmission, a network device, and a terminal.

BACKGROUND

A next-generation mobile communications system includes various wireless networks, and each of radio access technologies is distinctive in such aspects as capacity, coverage, data rate and mobility support capability. Novel radio access technologies emerge one after another. These radio access technologies complement each other, and are converged and integrated with each other.

In the prior art, when a terminal detects a proper wireless fidelity (WiFi) access point (AP), the terminal disconnects from a 3G (3rd Generation) network, and automatically switches to a WiFi network for service transmission; when the terminal does not detect a WiFi network, the terminal automatically switches back to the 3G network. However, this method has low resource utilization of a wireless communications network.

SUMMARY

Multiple aspects of this application provide a method for controlling transmission, a network device and a terminal, so as to improve resource utilization of a wireless communications network.

One aspect of this application provides a method for controlling transmission, including: determining, by a first radio access network device according to a service transmission condition of a terminal in a first single-mode wireless communications system, that a multimode wireless communications system comprises at least two wireless communications systems transmits a service for the terminal; and sending, by the first radio access network device, first control information to the terminal, where the first control information includes link information of the at least two wireless communications systems, so that the terminal switches a service, which is transmitted in the first single-mode wireless communications system, to the multimode wireless communications system according to the link information of the at least two wireless communications systems.

Another aspect of this application provides another method for controlling transmission, including: receiving, by a terminal, first control information delivered by a first radio access network device, where the first control information includes link information of at least two wireless communications systems; and switching, by the terminal according to the link information of the at least two wireless communications systems, a service, which is transmitted in a first single-mode wireless communications system, to a multimode wireless communications system comprising the at least two wireless communications systems.

Another aspect of this application further provides a radio access network device, including: a processor, configured to determine, according to a service transmission condition of a terminal in a first single-mode wireless communications system, that a multimode wireless communications system comprises at least two wireless communications systems transmits a service for the terminal; and a sender, configured to send first control information to the terminal, where the first control information includes link information of the at least two wireless communications systems, so that the terminal switches a service, which is transmitted in the first single-mode wireless communications system, to the multimode wireless communications system according to the link information of the at least two wireless communications systems.

Another aspect of this application further provides a terminal, including: a receiver, configured to receive first control information delivered by a first radio access network device, where the first control information includes link information of at least two wireless communications systems; and a processor, configured to switch, according to the link information of the at least two wireless communications systems, a service, which is transmitted in a first single-mode wireless communications system, to a multimode wireless communications system comprising the at least two wireless communications systems.

According to the method for controlling transmission, the network device and the terminal described above, a radio access network device controls, according to a service transmission condition of the terminal in a single-mode wireless communications system, the terminal to switch a service, which is transmitted in the single-mode wireless communications system, to a multimode wireless communications system. In this way, resource utilization of a wireless communications network is improved.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description merely show some embodiments of the present application, and persons of ordinary skill in the art may still derive other drawings from these accompanying drawings without creative efforts.

DETAILED DESCRIPTION

The following clearly and completely describes the technical solutions in the embodiments of this application with reference to the accompanying drawings in the embodiments of this application. Apparently, the described embodiments are merely a part rather than all of the embodiments of this application. All other embodiments obtained by persons of ordinary skill in the art based on the embodiments of this application without creative efforts shall fall within the protection scope of this application.

The technology described in this document may be used in various communications systems, for example, current 2G and 3G communications systems and the next-generation communications system, for example, a global system for mobile communications (GSM, Global System for Mobile communications) system, a code division multiple access (CDMA, Code Division Multiple Access) system, a time division multiple access (TDMA, Time Division Multiple Access) system, a wideband code division multiple access (WCDMA, Wideband Code Division Multiple Access Wireless) system, a frequency division multiple access (FDMA, Frequency Division Multiple Access) system, an orthogonal frequency-division multiple access (OFDMA, Orthogonal Frequency-Division Multiple Access) system, a single-carrier FDMA (SC-FDMA) system, a general packet radio service (GPRS, General Packet Radio Service) system, a long term evolution (LTE, Long Term Evolution) system, and other types of communications systems.

Various aspects are described in the specification with reference to a terminal and/or a base station and/or a base station controller.

A terminal involved in this application, namely a user equipment, may be a wireless terminal or a wired terminal. The wireless terminal may refer to a device that provides a user with voice and/or data connectivity, a handheld device with a wireless connection function, or another processing device connected to a wireless modem. The wireless terminal may communicate with one or a plurality of core networks through a radio access network (for example, RAN, Radio Access Network). The wireless terminal may be a mobile terminal, such as a mobile phone (or referred to as a "cellular" phone) and a computer having a mobile terminal, for example, a portable, pocket, handheld, computer built-in or in-vehicle mobile device, which exchange voice and/or data with the radio access network. For example, it may be a device such as a personal communication service (PCS, Personal Communication Service) phone, a cordless telephone set, a Session Initiation Protocol (SIP) phone set, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

A first radio access network device and a second radio access network device involved in this application may both be a device that is independently disposed on a radio access network (Radio Access Network, RAN), for example, a base station, or a radio network controller (Radio Network Controller, RNC), or may both be a functional module in the foregoing devices on a radio access network.

The base station (for example, an access point) may refer to a device in communication with the wireless terminal via one or more sectors at an air interface in an access network. The base station may be configured to convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (BTS, Base Transceiver Station) in GSM or CDMA, may also be a base station (NodeB) in WCDMA, and may further be an evolved base station (NodeB, or eNB, or e-NodeB, evolved Node B) in LTE, which is not limited by this application.

The base station controller may be a base station controller (BSC, base station controller) in GSM or CDMA, or a radio network controller (RNC, Radio Network Controller) in WCDMA, which is not limited by this application.

In the solution provided by embodiments of this application, the terminal may support at least two wireless communications systems. These wireless communications systems may be a plurality of wireless communications systems included in 2G, 3G or 4G in the 3rd Generation Partnership Project (The 3rd Generation Partnership Project, 3GPP), for example, a general packet radio service (General Packet Radio Service, GPRS) system, a GSM system, an enhanced data rate for GSM evolution (Enhanced Data Rate for GSM Evolution, EDGE) system, a WCDMA system, a time division-synchronous code division multiple access (Time Division Synchronous Code Division Multiple Access, TD-SCDMA) system, or an LTE system, and may also be systems defined by such protocols as 802.11a, 802.11b, 802.11g, 802.11n and 802.11ac/ad on a non-3GPP network, for example, a wireless local area network (Wireless Local Area Network, WLAN), ZigBee (ZigBee), or Bluetooth (Bluetooth).

In addition, the terms "system" and "network" may be used interchangeably in this specification. The term "and/or" in this specification describes only an association relationship of associated objects, and represents that three relationships may exist. For example, A and/or B may represent the following three cases: Only A exists, both A and B exist, and only B exists. In addition, the symbol "/" in this specification generally indicates an "or" relationship between the associated objects.

Figure 1:
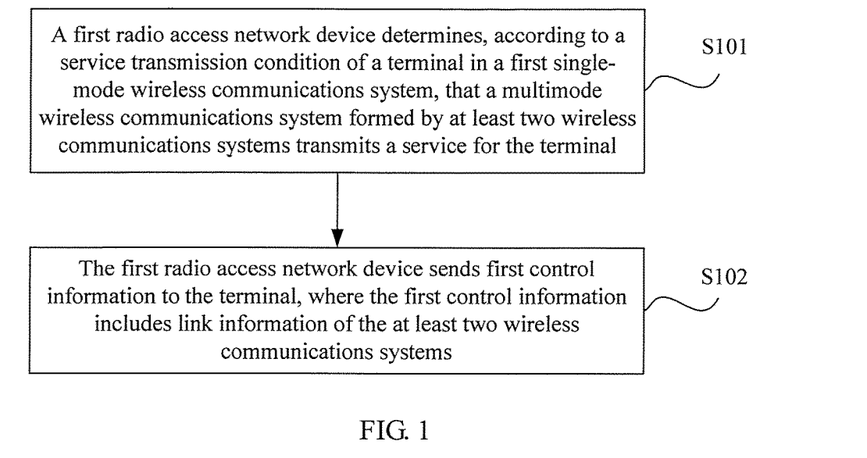
FIG. 1 is a flowchart of an embodiment of a method for controlling transmission according to this application.

FIG. 1 is a flowchart of an embodiment of a method for controlling transmission according to this application. As shown in FIG. 1:

S101: A first radio access network device determines, according to a service transmission condition of a terminal in a first single-mode wireless communications system, that a multimode wireless communications system comprises at least two wireless communications systems transmits a service for the terminal.

S102: The first radio access network device sends first control information to the terminal, where the first control information includes link information of the at least two wireless communications systems, so that the terminal switches a service, which is transmitted in the first single-mode wireless communications system, to the multimode wireless communications system according to the link information of the at least two wireless communications systems.

The first radio access network device involved in this embodiment of the application may be an RAN side device disposed in the first single-mode wireless communications system.

The first single-mode wireless communications system may be any wireless communications system supported by the terminal. The service transmitted in the first single-mode wireless communications system by the terminal may include one or more types of services, for example, a voice service, a video service, or an Internet access service.

In a process of transmitting the service in the first single-mode wireless communications system by the terminal, the first radio access network device may determine, according to the service transmission condition of the terminal in the first single-mode wireless communications system, a multimode wireless communications system used for service transmission for the terminal, where the multimode wireless communications system may include at least two wireless communications systems, and the at least two wireless communications systems are heterogeneous wireless communications systems, for example, the multimode wireless communications system may include WiFi system and WCDMA system. The multimode wireless communications system may include the first single-mode wireless communications system, or may not include the first single-mode wireless communications system.

Optionally, the service transmission condition of the terminal in the first single-mode wireless communications system may include one or more of the following: a data volume of a service of the terminal transmitted in the first single-mode wireless communications system, link quality of the first single-mode wireless communications system, and a cache idle rate of the first single-mode wireless communications system (where the cache idle rate is related to such factors as the number of users accessing the wireless communications system and a service volume). The first radio access network device may perform real-time monitoring on the data volume of the service of the terminal transmitted in the first single-mode wireless communications system, so as to count the data volume of the service of the terminal transmitted in the first single-mode wireless communications system; or the terminal may report, to the first radio access network device, the data volume of the service of the terminal transmitted in the first single-mode wireless communications system. In addition, the first radio access network device may also detect the link quality of the first single-mode wireless communications system; or the terminal may also detect the link quality of the first single-mode wireless communications system, and then report a result of the detection to the first radio access network device.

For example, the first radio access network device may monitor in real time and count the data volume of the service of the terminal transmitted in the first single-mode wireless communications system, and if the data volume of the service of the terminal transmitted in the first single-mode wireless communications system reaches a set data volume threshold, the first radio access network device may determine the multimode wireless communications system used for service transmission for the terminal. For another example, the terminal may report the link quality of the first single-mode wireless communications system to the first radio access network device, and if the link quality of the first single-mode wireless communications system is lower than a set quality threshold, the first radio access network device may determine the multimode wireless communications system used for service transmission for the terminal. For another example, when the first radio access network device detects that a link cache of the first single-mode wireless communications system is less than a set cache value, the first radio access network device may determine the multimode wireless communications system used for service transmission for the terminal.

The foregoing are only several feasible implementation manners of determining, by the first radio access network device, a multimode wireless communications system used for service transmission for the terminal, which, however, do not constitute a limitation on this application.

It should be understood that, according to the data volume of the service of the terminal, link quality of each wireless communications system, a type and capability of a service that can be carried, a cache idle rate of each wireless communications system and so on, the first radio access network device may determine how many wireless communications systems are included in the multimode wireless communications system and which wireless communications systems are specifically included in the multimode wireless communications system. For example, in an implementation scenario in which the data volume of the service of the terminal is relatively large, the first radio access network device may determine that a relatively large number of wireless communications systems transmit the service for the terminal; in an implementation scenario in which the data volume of the service of the terminal is relatively small, the first radio access network device may determine that a relatively small number of wireless communications systems transmit the service for the terminal. For another example, the first radio access network device may determine that a wireless communications system with relatively good link quality transmits the service for the terminal. For another example, the first radio access network device may determine that a wireless communications system with a relatively high cache idle rate transmits the service for the terminal.

The first radio access network device may acquire the link quality of each wireless communications system, the type and capability of the service that can be carried, and the cache idle rate by interacting with a network element in each wireless communications system, for example, an RAN side device in each wireless communications system.

After determining, according to the service transmission condition of the terminal in the first single-mode wireless communications system, the multimode wireless communications system used for service transmission for the terminal, the first radio access network device may deliver the first control information to the terminal, to instruct the terminal to switch the service, which is transmitted in the first single-mode wireless communications system, to the multimode wireless communications system. The first control information may carry the link information of the at least two wireless communications systems included in the multimode wireless communications system, where the link information of each of the wireless communications systems includes: identity information of a cell that can be accessed by the terminal in the wireless communications system, frequency information of the cell, an Internet Protocol (Internet Protocol, IP) address that is assigned by the first radio access network device to the terminal for service transmission, and so on.

After receiving the first control information delivered by the first radio access network device, the terminal may establish a link in the at least two wireless communications systems according to the link information of the at least two wireless communications systems that is carried in the first control information, so as to switch the service, which is transmitted in the first single-mode wireless communications system by the terminal, to the at least two wireless communications systems for transmission.

After establishing multiple links in the multimode wireless communications system, the terminal may separately transmit service data, that is, an IP data stream, over the links of the at least two wireless communications systems included in the multimode wireless communications system.

It should be noted that, in an implementation scenario in which the service transmitted in the first single-mode wireless communications system by the terminal includes one service type, the first radio access network device may determine, for the terminal, that service data of the service type is separately transmitted in the at least two wireless communications systems included in the multimode wireless communications system, where a proportion of the service data transmitted in each wireless communications system may be determined by the first radio access network device according to such a factor as the link quality of each wireless communications system. For example, the first radio access network device may determine that a proportion of service data transmitted in a wireless communications system with relatively good link quality is higher than that of data transmitted in a wireless communications system with relatively poor link quality.

In an implementation scenario in which the service transmitted in the first single-mode wireless communications system by the terminal includes two or more service types, the first radio access network device may determine, for the terminal, that service data of the two or more service types is separately transmitted in the at least two wireless communications systems included in the multimode wireless communications system. Which type of service or a data volume of which type of service is to be transmitted in each wireless communications system may be determined by the first radio access network device according to such a factor as the link quality of each wireless communications system, the data volume of the service of the terminal, or the service type. For example, the first radio access network device may determine that the terminal transmits a video service in a wireless communications system with relatively good link quality, and may determine that the terminal transmits a voice service in a wireless communications system with relatively poor link quality. The first radio access network device may add indication information to the first control information, and indicate, by using the indication information, which type of service of the terminal is to be transmitted in which wireless communications system.

After the terminal transmits the service by using the multimode wireless communications system determined by the radio access network device, optionally, a second radio access network device may further determine, according to a service transmission condition of the terminal in the multimode wireless communications system, a second single-mode wireless communications system used for service transmission for the terminal.

In an implementation scenario in which the multimode wireless communications system includes the first single-mode wireless communications system, the second radio access network device may be an RAN side device in the first single-mode wireless communications system, for example, the second radio access network device may be a first device; in an implementation scenario in which the multimode wireless communications system does not include the first single-mode wireless communications system, the second radio access network device may be an RAN side device in any wireless communications system in the multimode wireless communications system.

The service transmission condition of the terminal in the multimode wireless communications system may include one or more of the following: link quality of the at least two wireless communications systems included in the multimode wireless communications system, cache idle rates of the at least two wireless communications systems included in the multimode wireless communications system, and offloading thresholds of the at least two wireless communications systems included in the multimode wireless communications system, where the offloading threshold is set according to an attribute of the wireless communications system.

The second radio access network device may acquire the link quality of each wireless communications system in the multimode wireless communications system by interacting with a network element in each wireless communications system in the multimode wireless communications system, for example, an RAN side device; or the terminal may detect link quality of the multimode wireless communications system, and then report a detection result to the second radio access network device. The second radio access network device may acquire the cache idle rate and the offloading threshold of each wireless communications system in the multimode wireless communications system by interacting with a network element in each wireless communications system in the multimode wireless communications system. The offloading threshold may be set according to an attribute of the wireless communications system. A greater offloading threshold indicates a relatively smaller volume of data that can be transmitted.

For example, if the second radio access network device learns that a cache idle rate of one or more wireless communications systems in the multimode wireless communications system is lower than a set cache threshold by interacting with a network element in each wireless communications system in the multimode wireless communications system, the second radio access network device may determine a second single-mode wireless communications system used for service transmission for the terminal. For another example, if the second radio access network device learns that link quality of one or more wireless communications systems in the multimode wireless communications system is lower than a set quality threshold by interacting with a network element in each wireless communications system in the multimode wireless communications system, the second radio access network device may determine a second single-mode wireless communications system with relatively good link quality in the multimode wireless communications system for the terminal; or determine a second single-mode wireless communications system in a wireless communications system except the multimode wireless communications system for the terminal. For another example, due to a resource bottleneck, a UMTS in the multimode wireless communications system is difficult to support transfer of large data traffic and has a relatively great offloading threshold; therefore, to avoid UMTS link congestion caused by transfer of large data traffic. When a data volume of a service transmitted in the UMTS is relatively large, the second radio access network device may determine that the UMTS does not transmits the service for the terminal any more.

The foregoing are only several feasible implementation manners of determining, by the radio access network device, a second single-mode wireless communications system used for service transmission for the terminal, which, however, does not constitute a limitation on this application.

It should be understood that, the second radio access network device may further determine which wireless communications system is specifically the second single-mode wireless communications system according to the link quality of each wireless communications system, the type and capability of the service that can be carried, the cache idle rate, and so on. For example, the second radio access network device may determine that a wireless communications system with relatively good link quality is the second single-mode wireless communications system. For another example, the second radio access network device may determine that a wireless communications system with a relatively high cache idle rate is the second single-mode wireless communications system.

After determining, according to the service transmission condition of the terminal in the multimode wireless communications system, the second single-mode wireless communications system used for service transmission for the terminal, the second radio access network device may deliver second control information to the terminal, to instruct the terminal to switch the service, which is transmitted in the multimode wireless communications system, to the second single-mode wireless communications system.

The second control information may carry link information of the second single-mode wireless communications systems, where the link information may include: identity information of a cell that can be accessed by the terminal in the second single-mode wireless communications systems, frequency information of the cell, an IP address that is assigned by the second radio access network device to the terminal for service transmission, a user name and an authentication password for accessing a hotspot, and so on.

After receiving the second control information delivered by the second radio access network device, the terminal may switch, according to the link information of the second single-mode wireless communications system that is carried in the second control information, the service, which is transmitted in the multimode wireless communications system by the terminal, to the second single-mode wireless communications system for transmission.

The second single-mode wireless communications system determined by the second radio access network device may be any wireless communications system in the multimode wireless communications system, or may be any wireless communications system except the multimode wireless communications system.

According to the method for controlling transmission provided in this embodiment, a radio access network device determines, according to a service transmission condition of a terminal in a single-mode wireless communications system, a multimode wireless communications system used for service transmission for the terminal, and sends, to the terminal, control information that carries link information of the multimode wireless communications system, so that the terminal switches a service, which is transmitted in the single-mode wireless communications system, to the multimode wireless communications system according to the control information. In this way, resource utilization of a wireless communications network is improved.

Figure 2:
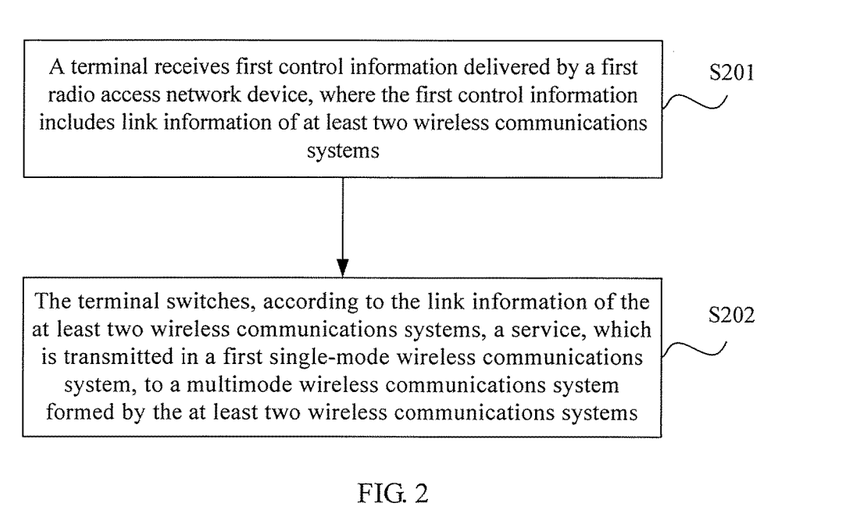
FIG. 2 is a flowchart of another embodiment of a method for controlling transmission according to this application.

FIG. 2 is a flowchart of another embodiment of a method for controlling transmission according to this application. As shown in FIG. 2:

S201: A terminal receives first control information delivered by a first radio access network device, where the first control information includes link information of at least two wireless communications systems.

S202: The terminal switches, according to the link information of the at least two wireless communications systems, a service, which is transmitted in a first single-mode wireless communications system, to a multimode wireless communications system comprising the at least two wireless communications systems.

In an initial state of the terminal, a first single-mode wireless communications system used to transmit service data may be any wireless communications system supported by the terminal. The service transmitted in the first single-mode wireless communications system by the terminal may include one or more types of services.

In a process of transmitting a service in the first single-mode wireless communications system by the terminal, the first radio access network device may determine, according to a service transmission condition of the terminal in the first single-mode wireless communications system, a multimode wireless communications system used for service transmission for the terminal. For a specific process that the first radio access network device may determine, according to a service transmission condition of the terminal in the first single-mode wireless communications system, a multimode wireless communications system used for service transmission for the terminal, reference may be made to the manner described in the foregoing embodiment shown in FIG. 1, and details are not described herein again.

After determining, according to the service transmission condition of the terminal in the first single-mode wireless communications system, the multimode wireless communications system used for service transmission for the terminal, the first radio access network device may deliver first control information to the terminal, to instruct the terminal to switch the service, which is transmitted in the first single-mode wireless communications system, to the multimode wireless communications system. The first control information may carry link information of the at least two wireless communications systems included in the multimode wireless communications system.

After receiving the first control information delivered by the radio access network device, the terminal may establish a link in the at least two wireless communications systems according to the link information of the at least two wireless communications systems that is carried in the first control information, so as to switch the service, which is transmitted in the first single-mode wireless communications system by the terminal, to the at least two wireless communications systems for transmission.

It should be noted that, the terminal may switch the service, which is transmitted in the first single-mode wireless communications system, to all or a part of wireless communications systems in the multimode wireless communications system according to a type of a wireless communications system supported by the terminal and/or a type of a service that is transmitted. For example, if the multimode wireless communications system determined by the first radio access network device includes three heterogeneous wireless communications systems, the terminal may select to switch the service, which is transmitted in the first single-mode wireless communications system, to any two of the wireless communications systems.

After establishing multiple links in the multimode wireless communications system, the terminal may separately transmit service data, that is, an IP data stream, over the links of the at least two wireless communications systems included in the multimode wireless communications system.

Figure 3:
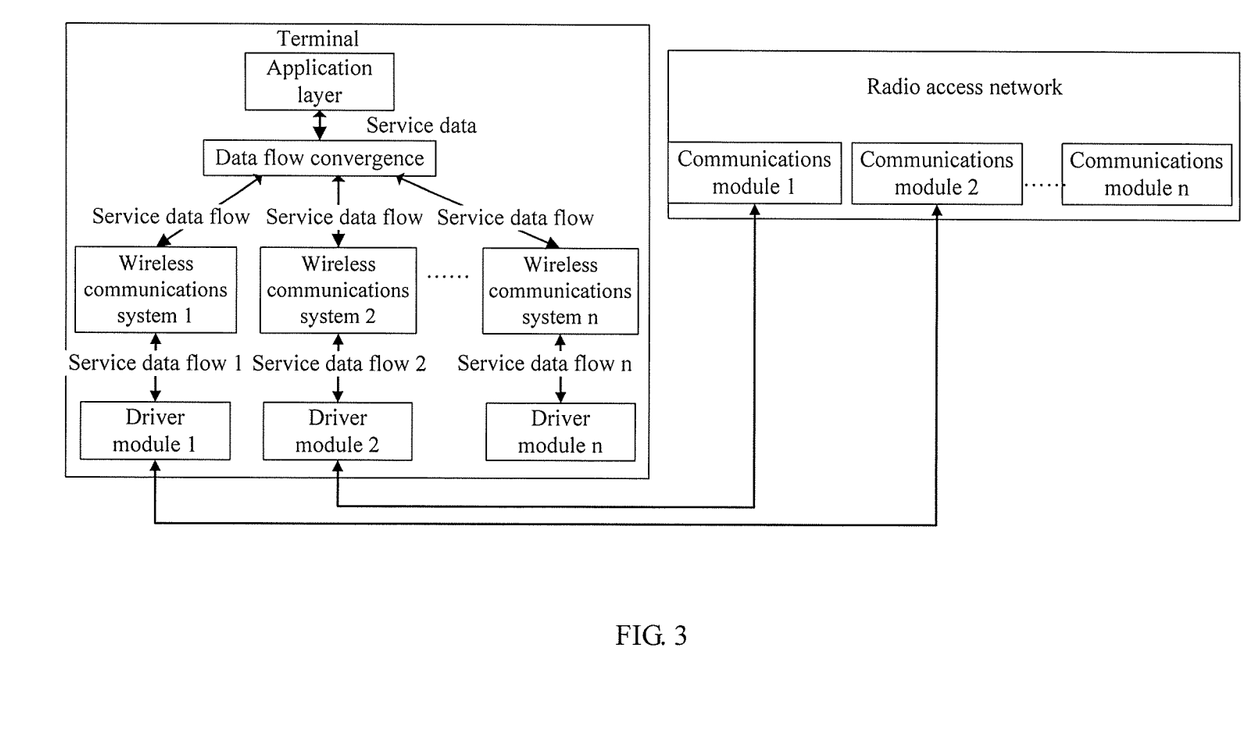
FIG. 3 is a schematic diagram of service transmission performed in a multimode wireless communications system by a terminal according to an embodiment of this application.

If the terminal in an initial state transmits service data in a 3G wireless communications system, for example, a UMTS/LTE, the second radio access network device may determine that the terminal transmits the service data in a multimode wireless communications system, which includes the 3G wireless communications system and a WLAN wireless communications system. After the terminal switches a service, which is transmitted in the 3G, to the multimode wireless communications system, as shown in FIG. 3, after an application layer of the terminal delivers service data, the service data may be sent to a radio access network by using links of n wireless communications systems, where n is an integer greater than or equal to 2. Service data sent from an access network including at least two wireless communications systems to the terminal may also be sent to the terminal by using the links of the n wireless communications systems, and sent to the application layer of the terminal after data stream convergence.

It should be noted that, the multimode wireless communications system determined by the first radio access network device may include the first single-mode wireless communications system, or may not include the first single-mode wireless communications system.

In an implementation scenario in which the multimode wireless communications system includes the first single-mode wireless communications system, after receiving the first control information, the terminal may maintain a service transmission link that has been established in the first single-mode wireless communications system, and establish a service transmission link in another system in the multimode wireless communications system except the first single-mode wireless communications system according to the link information included in the first control information. In an implementation scenario in which the multimode wireless communications system does not include the first single-mode wireless communications system, after receiving the first control information, the terminal may release a service transmission link that has been established in the first single-mode wireless communications system, and establish a service transmission link in each wireless communications system included in the multimode wireless communications system according to the link information included in the first control information.

After the terminal transmits the service by using the multimode wireless communications system determined by the first radio access network device, optionally, a second radio access network device may further determine, according to a service transmission condition of the terminal in the multimode wireless communications system, a second single-mode wireless communications system used for service transmission for the terminal. For a specific process that a second radio access network device may determine, according to a service transmission condition of the terminal in the multimode wireless communications system, a second single-mode wireless communications system used for service transmission for the terminal, reference may be made to the manner described in the foregoing embodiment shown in FIG. 1, and details are not described herein again.

After determining, according to the service transmission condition of the terminal in the multimode wireless communications system, the second single-mode wireless communications system used for service transmission for the terminal, the second radio access network device may deliver second control information to the terminal, to instruct the terminal to switch the service, which is transmitted in the multimode wireless communications system, to the second single-mode wireless communications system.

The second control information may carry link information of the second single-mode wireless communications system.

After receiving the second control information delivered by the second radio access network device, the terminal may switch, according to the link information of the second single-mode wireless communications system that is carried in the second control information, the service, which is transmitted in the multimode wireless communications system by the terminal, to the second single-mode wireless communications system for transmission.

If the multimode wireless communications system includes the second single-mode wireless communications system, the terminal may maintain a service transmission link of the second single-mode wireless communications system, and release a service transmission link of another wireless communications system in the multimode wireless communications system. If the multimode wireless communications system does not include the second single-mode wireless communications system, the terminal may release links of all wireless communications systems in the multimode wireless communications system, and establish a service transmission link in the second single-mode wireless communications system.

According to the method for controlling transmission provided in this embodiment, a radio access network device determines, according to a service transmission condition of the terminal in the single-mode wireless communications system, a multimode wireless communications system used for service transmission for the terminal, and sends, to the terminal, control information that carries link information of the multimode wireless communications system. After receiving the control information delivered by the radio access network device, the terminal may switch, according to the link information of the multimode wireless communications system that is carried in the control information, a service, which is transmitted in the single-mode wireless communications system, to the multimode wireless communications system. In this way, resource utilization of a wireless communications network is improved.

Figure 4:
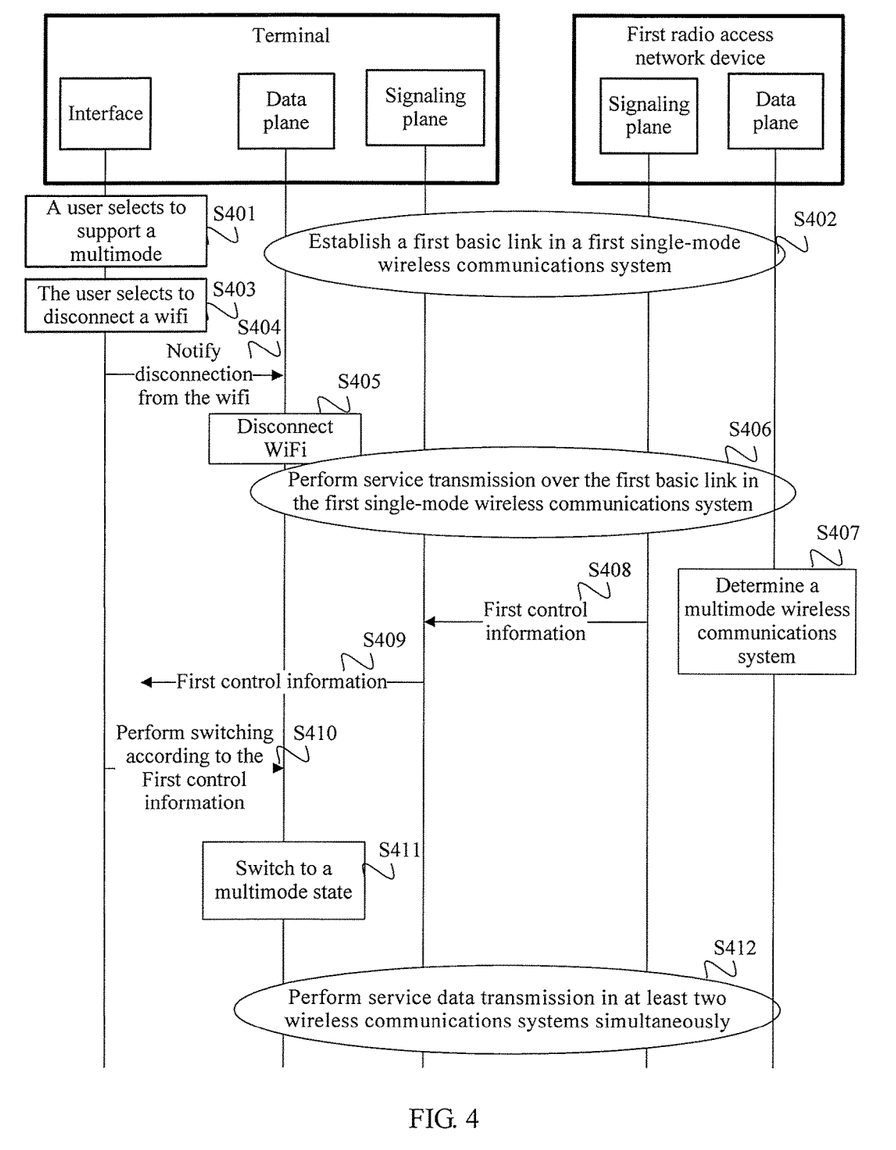
FIG. 4 is a flowchart of still another embodiment of a method for controlling transmission according to this application.

FIG. 4 is a flowchart of still another embodiment of a method for controlling transmission according to this application. As shown in FIG. 4, this embodiment provides a process of switching, by a terminal, a service, which is transmitted in a single-mode wireless communications system, to a multimode wireless communications system.

S401: A terminal receives an input signal indicating that a user selects to support a multimode wireless communications system.

In this embodiment, a user selects to support a multimode wireless communications system in an interface of the terminal, and the user inputs a signal by using an input apparatus of the terminal, where the interface may be a man-machine interaction interface between the user and the terminal. A signaling plane of the terminal may be an interface for signaling interaction between the terminal and a radio access network device. A data plane of the terminal may be an interface for service transmission between the terminal and a radio access network device.

S402: The terminal establishes a first basic link in a first single-mode wireless communications system.

For example, if the first single-mode wireless communications system is a 3G network, the terminal may establish, in the 3G network, a first basic link as a control link; and the terminal accesses the 3G network to establish a Packet Data Protocol (Packet Data Protocol, PDP) connection, and maintains a Radio Resource Control (Radio Resource Control, RRC) connection during the establishment of the first basic link.

It should be noted that, the first basic link established in the first single-mode wireless communications system by the terminal may serve only as a control link. Alternatively, in addition to serving as a control link, the first basic link may also serve as a service transmission link, over which the terminal transmits service data in the first single-mode wireless communications system.

S403: The terminal receives an input signal indicating that the user selects to disconnect a WiFi connection.

The user selects to disconnect a WiFi connection in the interface of the terminal, and the user inputs, by using the input apparatus of the terminal, an input signal of disconnecting the WiFi connection.

S404: The terminal instructs a data plane to disconnect from a WiFi wireless communications system.

S405: The data plane of the terminal disconnects from the WiFi wireless communications system.

S403 to S405 are optional steps. In this embodiment, the first single-mode wireless communications system for initial service transmission of the terminal is not a WiFi, but after the terminal, such as a mobile phone or a PAD, is powered on, the data plane automatically searches for a WiFi AP to access the WiFi wireless communications system. Therefore, the data plane of the terminal may first disconnect from the WiFi wireless communications system, that is, the terminal does not perform an operation of preferentially accessing a WiFi AP any more, but transmits service data only in the first single-mode wireless communications system.

S406: The terminal performs service transmission over the first basic link in the first single-mode wireless communications system.

In this embodiment, the first basic link not only serves as a control link, but also serves as a service transmission link.

S407: A first radio access network device determines, according to a service transmission condition of the terminal in the first single-mode wireless communications system, that a multimode wireless communications system comprises at least two wireless communications systems transmits a service for the terminal.

For a specific process that the first radio access network device may determine, according to a service transmission condition of the terminal in the first single-mode wireless communications system, a multimode wireless communications system used for service transmission for the terminal, reference may be made to the manner described in the foregoing embodiment shown in FIG. 1, and details are not described herein again.

S408: The first radio access network device sends first control information to the terminal, where the first control information includes link information of the at least two wireless communications systems.

S409: A signaling plane of the terminal sends the first control information to the terminal.

S410: The terminal sends indication information to the data plane, where the indication information is used to instruct the terminal to perform wireless communications system switching according to the link information included in the first control information.

S411: The terminal switches, according to the link information of the at least two wireless communications systems, a service, which is transmitted in the first single-mode wireless communications system, to the multimode wireless communications system comprising the at least two wireless communications systems.

For example, if the multimode wireless communications system determined by the first radio access network device includes the first single-mode wireless communications system for initial service transmission of the terminal and a WiFi, the terminal may maintain a connection to the first single-mode wireless communications system, and establish a connection to a corresponding WiFi AP according to the link information of the WiFi that is carried in the first control information.

S412: The terminal separately performs service data transmission in the at least two wireless communications systems included in the multimode wireless communications system.

According to the method for controlling transmission provided in this embodiment, a radio access network device can uniformly manage resources of a multimode wireless communications system, and determine, according to a service transmission condition of a terminal in a single-mode wireless communications system, the multimode wireless communications system used for service transmission for the terminal, so that the terminal switches, a service, which is transmitted in the single-mode wireless communications system, to the multimode wireless communications system. In this way, resource utilization of multimode wireless communications in the field of heterogeneous networks is effectively improved, making service transmission control of a terminal more flexible. For example, in a multimode wireless communications system comprising a WLAN and the 3GPP, the WLAN and the 3GPP can complement each other with respective advantages. For example, an Internet access service of a user may be offloaded to the WLAN, and a voice service or another high value-added service of a user may be offloaded to 2G/3G/LTE.

Figure 5:
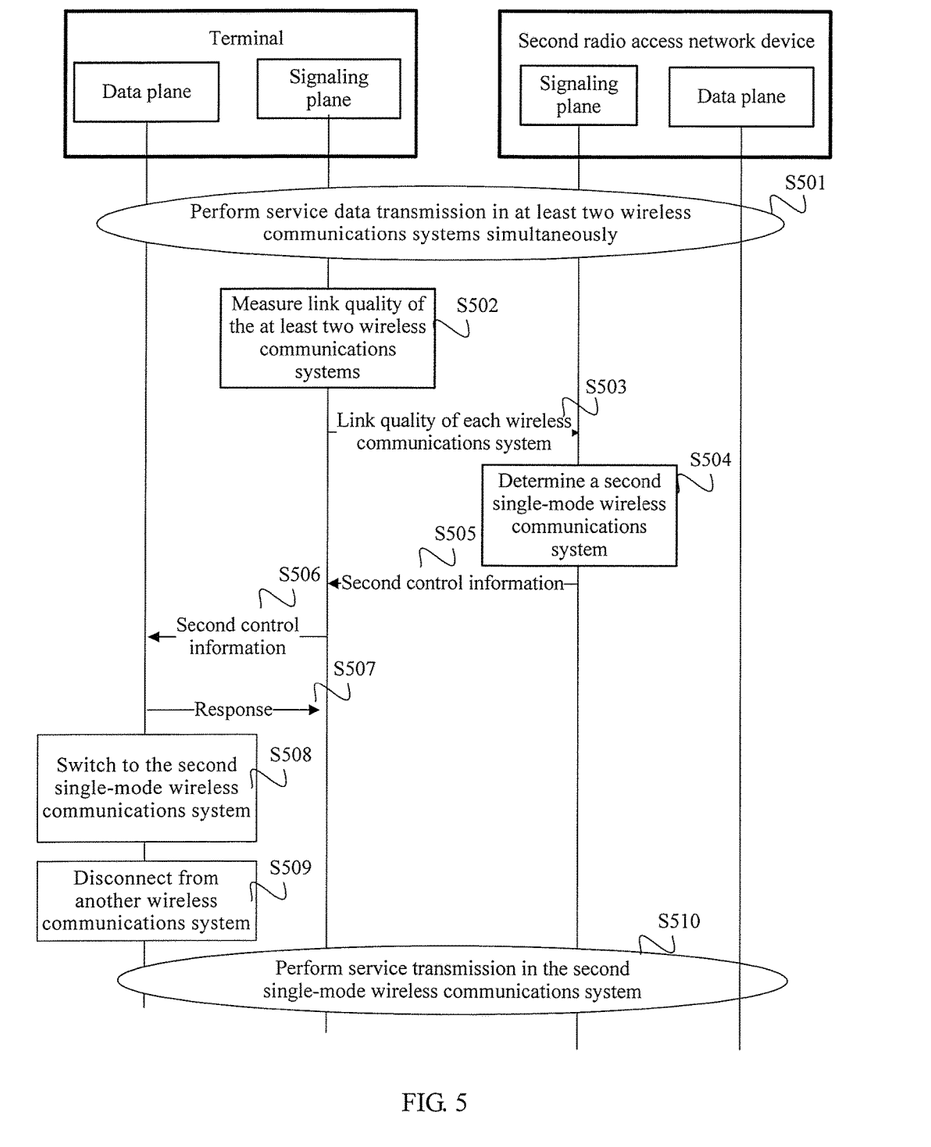
FIG. 5 is a flowchart of still another embodiment of a method for controlling transmission according to this application.

FIG. 5 is a flowchart of still another embodiment of a method for controlling transmission according to this application. As shown in FIG. 5, this embodiment provides a process of switching, by a terminal, a service, which is transmitted in a multimode wireless communications system, to a single-mode wireless communications system.

S501: A terminal separately performs service data transmission in at least two wireless communications systems included in a multimode wireless communications system.

S502: The terminal measures link quality of the at least two wireless communications systems.

S503: The terminal reports the link quality of the at least two wireless communications systems to a second radio access network device.

S504: The second radio access network device determines, according to a service transmission condition of the terminal in the multimode wireless communications system, that a second single-mode wireless communications system transmits a service for the terminal.

For a specific process that a second radio access network device may determine, according to a service transmission condition of the terminal in the multimode wireless communications system, a second single-mode wireless communications system used for service transmission for the terminal, reference may be made to the manner described in the foregoing embodiment shown in FIG. 1, and details are not described herein again.

S505: The second radio access network device sends second control information to the terminal, where the second control information includes link information of the second single-mode wireless communications system.

Optionally, the terminal may establish a second basic link in any wireless communications system in the multimode wireless communications system, and the second radio access network device may send the second control information to the terminal over the second basic link. The second basic link may be a service transmission link used for the terminal to transmit service data in the multimode wireless communications system, or may be a non-service transmission link established in the multimode wireless communications system by the terminal.

In an implementation scenario in which the multimode wireless communications system includes the first single-mode wireless communications system, the second radio access network device may be an RAN side device in the first single-mode wireless communications system, and the second basic link may be the first basic link; in an implementation scenario in which the multimode wireless communications system does not include the first single-mode wireless communications system, the second radio access network device may be an RAN side device in any wireless communications system in the multimode wireless communications system.

S506: A signaling plane of the terminal sends the second control information to a data plane.

S507: The data plane responds to the signaling plane and performs wireless communications system switching according to the second control information.

S508: The data plane switches a service, which is transmitted in the multimode wireless communications system, to the second single-mode wireless communications system according to the link information of the second single-mode wireless communications system.

S509: The data plane disconnects from all wireless communications systems except the second single-mode wireless communications system.

S510: The terminal performs service transmission in the second single-mode wireless communications system.

According to the method for controlling transmission provided in this embodiment, a radio access network device controls, according to a service transmission condition of a terminal in a multimode wireless communications system, the terminal to switch a service, which is transmitted in the multimode wireless communications system, to a single-mode wireless communications system. In this way, resource utilization of multimode wireless communications in the field of heterogeneous networks is effectively improved, making service transmission control of a terminal more flexible.

Figure 6:
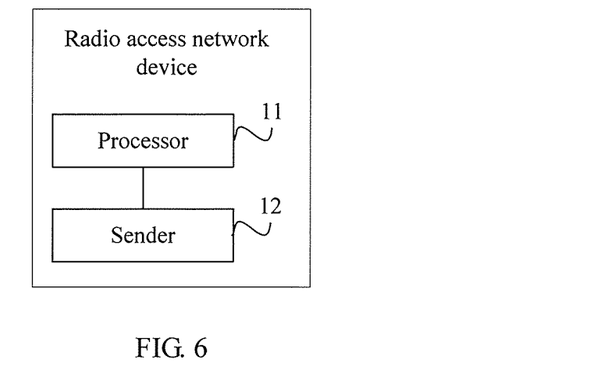
FIG. 6 is a schematic structural diagram of an embodiment of a radio access network device according to this application.

FIG. 6 is a schematic structural diagram of an embodiment of a radio access network device according to this application. As shown in FIG. 6, the radio access network device includes a processor 11 and a sender 12.

The processor 11 is configured to determine, according to a service transmission condition of a terminal in a first single-mode wireless communications system, that a multimode wireless communications system comprises at least two wireless communications systems transmits a service for the terminal.

The sender 12 is configured to send first control information to the terminal, where the first control information includes link information of the at least two wireless communications systems, so that the terminal switches a service, which is transmitted in the first single-mode wireless communications system, to the multimode wireless communications system according to the link information of the at least two wireless communications systems.

Figure 7:
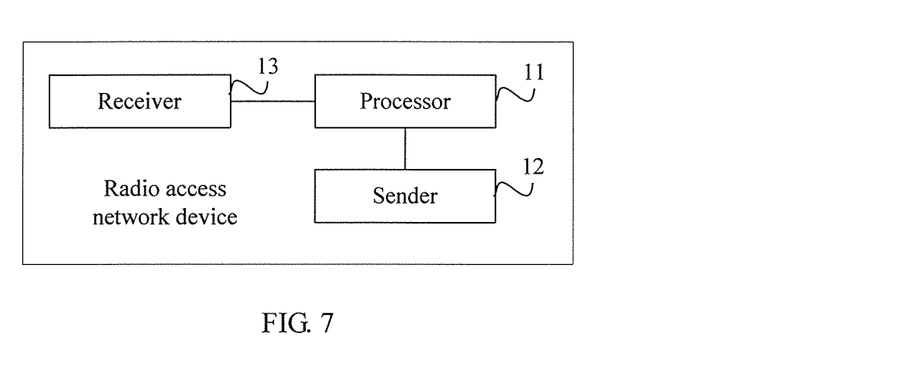
FIG. 7 is a schematic structural diagram of another embodiment of a radio access network device according to this application.

FIG. 7 is a schematic structural diagram of another embodiment of a radio access network device according to this application. As shown in FIG. 7, the radio access network device includes a processor 11, a sender 12, and a receiver 13.

Based on the foregoing embodiment, optionally, the service transmission condition of the terminal in the first single-mode wireless communications system may include one or more of the following: a data volume of a service of the terminal transmitted in the first single-mode wireless communications system, link quality of the first single-mode wireless communications system, and a cache idle rate of the first single-mode wireless communications system.

Optionally, the sender 12 may be specifically configured to send the first control information to the terminal over a first basic link, where the first basic link is a link established in the first single-mode wireless communications system by the terminal.

Optionally, the processor 11 may further be configured to determine, according to a service transmission condition of the terminal in the multimode wireless communications system, that a second single-mode wireless communications system transmits a service for the terminal.

The sender 12 may further be configured to send second control information to the terminal, where the second control information includes link information of the second single-mode wireless communications system, so that the terminal switches a service, which is transmitted in the multimode wireless communications system, to the second single-mode wireless communications system according to the link information of the second single-mode wireless communications system.

Optionally, the service transmission condition of the terminal in the multimode wireless communications system may include one or more of the following: link quality of the at least two wireless communications systems included in the multimode wireless communications system, cache idle rates of the at least two wireless communications systems included in the multimode wireless communications system, and offloading thresholds of the at least two wireless communications systems included in the multimode wireless communications system, where the offloading threshold is set according to an attribute of the wireless communications system.

The receiver 13 may be configured to receive the link quality, reported by the terminal, of the at least two wireless communications systems included in the multimode wireless communications system.

Optionally, the sender 12 may be specifically configured to send the second control information to the terminal over a second basic link, where the second basic link is a link established in any wireless communications system in the multimode wireless communications system by the terminal.

The radio access network device provided in this embodiment of the application and the sender, receiver and processor included in the radio access network device are corresponding to the method for controlling transmissions provided in the embodiments of this application, and are devices for executing the method for controlling transmissions. For a specific process of executing the method for controlling transmissions, reference may be made to relevant descriptions of the embodiments shown in FIG. 1, FIG. 2, FIG. 4 and FIG. 5, and details are not described herein again.

The radio access network device provided in this embodiment determines, according to a service transmission condition of a terminal in a single-mode wireless communications system, a multimode wireless communications system used for service transmission for the terminal, and sends, to the terminal, control information that carries link information of the multimode wireless communications system, so that the terminal switches a service, which is transmitted in the single-mode wireless communications system, to the multimode wireless communications system according to the control information. In this way, resource utilization of a wireless communications network is improved.

Figure 8:
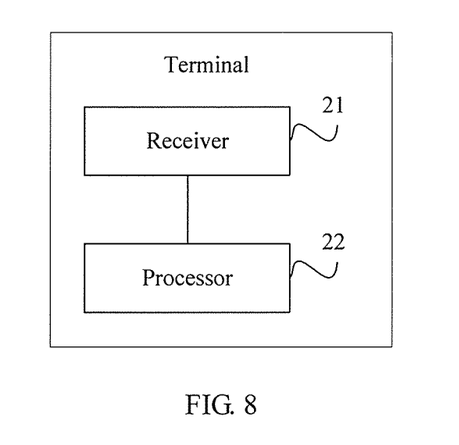
FIG. 8 is a schematic structural diagram of an embodiment of a terminal according to this application.

FIG. 8 is a schematic structural diagram of an embodiment of a terminal according to this application. As shown in FIG. 8, the terminal includes: a receiver 21 and a processor 22.

The receiver 21 is configured to receive first control information delivered by a first radio access network device, where the first control information includes link information of at least two wireless communications systems.

The processor 22 is configured to switch, according to the link information of the at least two wireless communications systems, a service, which is transmitted in a first single-mode wireless communications system, to a multimode wireless communications system comprising the at least two wireless communications systems.

Figure 9:
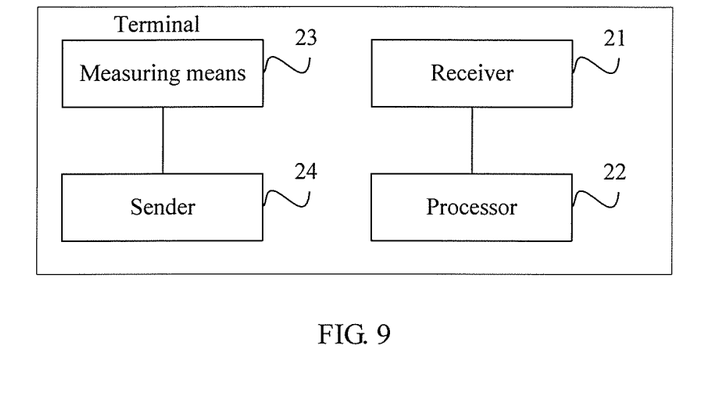
FIG. 9 is a schematic structural diagram of another embodiment of a terminal according to this application.

FIG. 9 is a schematic structural diagram of another embodiment of a terminal according to this application. As shown in FIG. 9, the terminal includes: a receiver 21, a processor 22, a measuring means 23, and a sender 24.

Based on the foregoing embodiment, the processor 22 may further be configured to establish a first basic link in the first single-mode wireless communications system.

The receiver 21 may specifically be configured to receive, over the first basic link, the first control information delivered by the first radio access network device.

Optionally, the receiver 21 may further be configured to receive second control information delivered by a second radio access network device, where the second control information includes link information of a second single-mode wireless communications system.

The processor 22 may further be configured to switch a service, which is transmitted in the multimode wireless communications system, to the second single-mode wireless communications system according to the link information of the second single-mode wireless communications system.

The measuring means 23 may be configured to measure link quality of the at least two wireless communications systems.

The sender 24 may be configured to report the link quality of the at least two wireless communications systems to the second radio access network device.

Optionally, the processor 22 may further be configured to establish a second basic link in any wireless communications system in the multimode wireless communications system.

The receiver 21 may further be configured to receive the second control information delivered over the second basic link by the second radio access network device.

The terminal provided in this embodiment of the application and the sender, receiver and processor included in the terminal are corresponding to the method for controlling transmissions according to the embodiments of the application, and are devices for executing the method for controlling transmissions. For a specific process of executing the method for controlling transmissions, reference may be made to relevant descriptions of the embodiments shown in FIG. 3 to FIG. 5, and details are not described herein again.

After receiving control information delivered by a radio access network device, the terminal provided in this embodiment can switch a service, which is transmitted in a single-mode wireless communications system, to a multimode wireless communications system according to link information of the multimode wireless communications system that is carried in the control information. In this way, resource utilization of a wireless communications network is improved.

It can be clearly understood by persons skilled in the art that, for the purpose of convenient and brief description, division of the foregoing function modules is used as an example for illustration, in actual implementation, the foregoing functions can be allocated to different modules and implemented according to the need, that is, inner structure of the apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some attributes may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected as required to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or apart of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from scope of the technical solutions of the embodiments of the present application.

What is claimed is:

1. A method for controlling transmission, the method comprising:
   determining, by a first radio access network device according to a service transmission condition of a terminal in a first single-mode wireless communications system, that a multimode wireless communications system comprising at least two wireless communications systems transmits a service for the terminal; and
   sending, by the first radio access network device, first control information to the terminal, wherein the first control information comprises link information of the at least two wireless communications systems, so that the terminal switches a service, which is transmitted in the first single-mode wireless communications system, to the multimode wireless communications system according to the link information of the at least two wireless communications systems;
   wherein a determination as to which wireless communications systems are the at least two wireless communications systems is determined by the first radio access network device according to a data volume of the service of the terminal, a link quality of each wireless communications system, a type of a service that can be carried by each wireless communications system, a capability of each wireless communications system carrying a service, and a cache idle rate of each wireless communications system.

2. The method according to claim 1, wherein the service transmission condition of the terminal in the first single-mode wireless communications system comprises one or more of the following: a data volume of a service of the terminal transmitted in the first single-mode wireless communications system, link quality of the first single-mode wireless communications system, and a cache idle rate of the first single-mode wireless communications system.

3. The method according to claim 1, wherein sending, by the first radio access network device, the first control information to the terminal comprises:
   sending, by the first radio access network device, the first control information to the terminal over a first basic link, wherein the first basic link is a link established in the first single-mode wireless communications system by the terminal.

4. The method according to claim 1, further comprising:
   determining, by a second radio access network device according to a service transmission condition of the terminal in the multimode wireless communications system, that a second single-mode wireless communications system transmits a service for the terminal; and
   sending, by the second radio access network device, second control information to the terminal, wherein the second control information comprises link information of the second single-mode wireless communications system, so that the terminal switches a service, which is transmitted in the multimode wireless communications system, to the second single-mode wireless communications system according to the link information of the second single-mode wireless communications system.

5. The method according to claim 4, wherein the service transmission condition of the terminal in the multimode wireless communications system comprises one or more of the following: link quality of the at least two wireless communications systems comprised in the multimode wireless communications system, cache idle rates of the at least two wireless communications systems comprised in the multimode wireless communications system, and offloading thresholds of the at least two wireless communications systems comprised in the multimode wireless communications system, wherein the offloading threshold is set according to an attribute of the wireless communications system.

6. The method according to claim 4, before determining that the second single-mode wireless communications system transmits the service for the terminal, the method further comprises:
   receiving, by the second radio access network device, the link quality, reported by the terminal, of the at least two wireless communications systems comprised in the multimode wireless communications system.

7. The method according to claim 4, wherein sending, by the second radio access network device, the second control information to the terminal comprises:
   sending, by the second radio access network device, the second control information to the terminal over a second basic link, wherein the second basic link is a link established in any wireless communications system in the multimode wireless communications system by the terminal.

8. A method for controlling transmission, the method comprising:
   receiving, by a terminal, first control information delivered by a first radio access network device, wherein the first control information comprises link information of at least two wireless communications systems; and
   switching, by the terminal according to the link information of the at least two wireless communications systems, a service, which is transmitted in a first single-mode wireless communications system, to a multimode wireless communications system comprising the at least two wireless communications systems;
   wherein a determination as to which wireless communications systems are the at least two wireless communications systems is determined by the first radio access network device according to a data volume of the service of the terminal, a link quality of each wireless communications system, a type of a service that can be carried by each wireless communications system, a capability of each wireless communications system carrying a service, and a cache idle rate of each wireless communications system.

9. The method according to claim 8, wherein:
   before receiving, by the terminal, the first control information delivered by the first radio access network device, the method further comprises:
      establishing, by the terminal, a first basic link in the first single-mode wireless communications system; and
   receiving, by the terminal, the first control information delivered by the first radio access network device comprises:
      receiving, by the terminal over the first basic link, the first control information delivered by the first radio access network device.

10. The method according to claim 8, wherein after switching the service, which is transmitted in the first single-mode wireless communications system, to the multimode wireless communications system comprising the at least two wireless communications systems, the method further comprises:

receiving, by the terminal, second control information delivered by a second radio access network device, wherein the second control information comprises link information of a second single-mode wireless communications system; and switching, by the terminal, a service, which is transmitted in the multimode wireless communications system, to the second single-mode wireless communications system according to the link information of the second single-mode wireless communications system.

11. The method according to claim 8, wherein after switching the service, which is transmitted in the first single-mode wireless communications system, to the multimode wireless communications system comprising the at least two wireless communications systems, the method further comprises:

measuring, by the terminal, link quality of the at least two wireless communications systems; and reporting, by the terminal, the link quality of the at least two wireless communications systems to the second radio access network device.

12. The method according to claim 10, wherein:

after switching the service, which is transmitted in the first single-mode wireless communications system, to the multimode wireless communications system comprising the at least two wireless communications systems, the method further comprises:

establishing, by the terminal, a second basic link in any wireless communications system in the multimode wireless communications system; and receiving, by the terminal, the second control information delivered by the second radio access network device comprises:

receiving, by the terminal, the second control information that is delivered over the second basic link by the second radio access network device.

13. A radio access network device, comprising:

a processor, configured to determine, according to a service transmission condition of a terminal in a first single-mode wireless communications system, that a multimode wireless communications system comprising at least two wireless communications systems transmits a service for the terminal; and a sender, configured to send first control information to the terminal, wherein the first control information comprises link information of the at least two wireless communications systems, so that the terminal switches a service, which is transmitted in the first single-mode wireless communications system, to the multimode wireless communications system according to the link information of the at least two wireless communications systems;

wherein the processor is further configured to determine, according to a data volume of the service of the terminal, a link quality of each wireless communications system, a type of a service that can be carried by each wireless communications system, a capability of each wireless communications system carrying a service, and a cache idle rate of each wireless communications system, which wireless communications systems are the at least two wireless communications systems.

14. The radio access network device according to claim 13, wherein the service transmission condition of the terminal in the first single-mode wireless communications system comprises one or more of the following: a data volume of a service of the terminal transmitted in the first single-mode wireless communications system, link quality of the first single-mode wireless communications system, and a cache idle rate of the first single-mode wireless communications system.

15. The radio access network device according to claim 13, wherein the sender is configured to send the first control information to the terminal over a first basic link, wherein the first basic link is a link established in the first single-mode wireless communications system by the terminal.

16. The radio access network device according to claim 13, wherein the processor is further configured to determine, according to a service transmission condition of the terminal in the multimode wireless communications system, that a second single-mode wireless communications system transmits a service for the terminal; and the sender is further configured to send second control information to the tell final, wherein the second control information comprises link information of the second single-mode wireless communications system, so that the terminal switches a service, which is transmitted in the multimode wireless communications system, to the second single-mode wireless communications system according to the link information of the second single-mode wireless communications system.

17. The radio access network device according to claim 16, wherein the service transmission condition of the terminal in the multimode wireless communications system comprises one or more of the following: link quality of the at least two wireless communications systems comprised in the multimode wireless communications system, cache idle rates of the at least two wireless communications systems comprised in the multimode wireless communications system, and offloading thresholds of the at least two wireless communications systems comprised in the multimode wireless communications system, wherein the offloading threshold is set according to an attribute of the wireless communications system.

18. The radio access network device according to claim 16, further comprising:

a receiver, configured to receive the link quality, reported by the terminal, of the at least two wireless communications systems comprised in the multimode wireless communications system.

19. The radio access network device according to claim 16, wherein the sender is configured to send the second control information to the terminal over a second basic link, wherein the second basic link is a link established in any wireless communications system in the multimode wireless communications system by the terminal.

20. A terminal, comprising:

a receiver, configured to receive first control information delivered by a first radio access network device, wherein the first control information comprises link information of at least two wireless communications systems; and a processor, configured to switch, according to the link information of the at least two wireless communications systems, a service, which is transmitted in a first single-mode wireless communications system, to a multimode wireless communications system comprising the at least two wireless communications systems;

wherein a determination as to which wireless communications systems are the at least two wireless communications systems is determined by the first radio access network device according to a data volume of the service of the terminal, a link quality of each wireless communications system, a type of a service that can be carried by each wireless communications system, a capability of each wireless communications system carrying a service, and a cache idle rate of each wireless communications system.

21. The terminal according to claim 20, wherein:

the processor is further configured to establish a first basic link in the first single-mode wireless communications system; and the receiver is configured to receive, over the first basic link, the first control information delivered by the first radio access network device.

22. The terminal according to claim 20, wherein:

the receiver is further configured to receive second control information delivered by a second radio access network device, wherein the second control information comprises link information of a second single-mode wireless communications system; and the processor is further configured to switch a service, which is transmitted in the multimode wireless communications system, to the second single-mode wireless communications system according to the link information of the second single-mode wireless communications system.

23. The terminal according to claim 20, wherein:

the processor is further configured to measure link quality of the at least two wireless communications systems; and the terminal further comprises a sender, configured to report the link quality of the at least two wireless communications systems to the second radio access network device.

24. The terminal according to claim 22, wherein:

the processor is further configured to establish a second basic link in any wireless communications system in the multimode wireless communications system; and the receiver is further configured to receive the second control information that is delivered over the second basic link by the second radio access network device.

* * * * *